Nov. 10, 1931.   C. H. LEONG   1,831,790
ROLL FILM PHOTOGRAPHIC CAMERA AND THE LIKE
Filed March 19, 1930
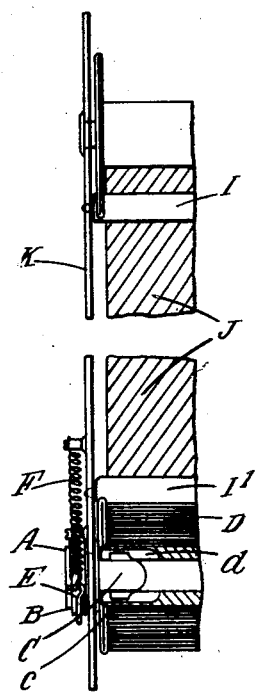
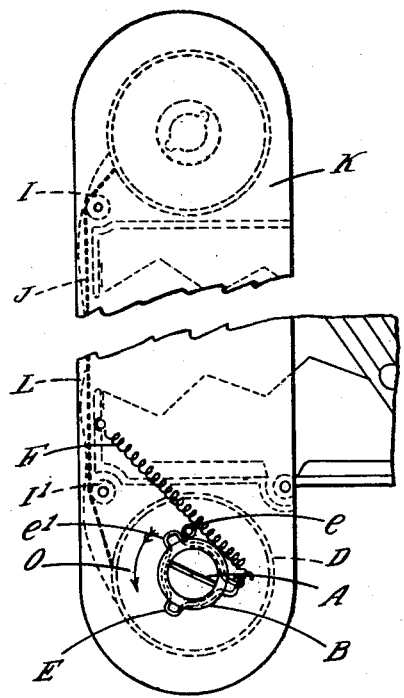
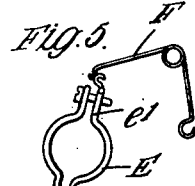
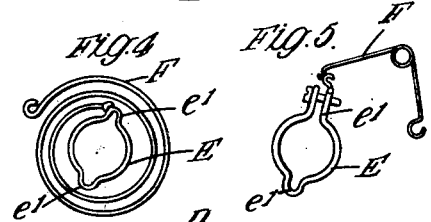
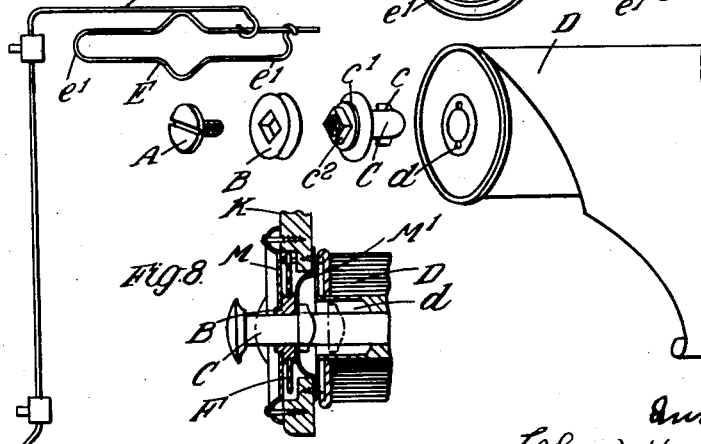
Inventor:
Chew Hock Leong Patented Nov. 10, 1931

1,831,790

UNITED STATES PATENT OFFICE

CHEW HOCK LEONG, OF SINGAPORE, STRAITS SETTLEMENTS, ASSIGNOR TO EASTMAN KODAK COMPANY, OF ROCHESTER, NEW YORK

ROLL FILM PHOTOGRAPHIC CAMERA AND THE LIKE

Application filed March 19, 1930, Serial No. 437,096, and in Great Britain April 13, 1929.

This invention relates to roll film photographic cameras and the like and has for its chief object to maintain flat the portion of the film between the film spools.

According to the invention this object is attained by maintaining the aforesaid portion of the film in a state of tension, and this may conveniently be brought about by imposing a torque on one of the spools. The torque may be imposed by means of a clutch comprising two frictionally engaging members one of which moves with the spool and the other of which is resiliently urged, for example by means of a spring, in a direction to tension the film and is adapted to slip with respect to the first member while the film is being wound, the clutch being conveniently mounted on the outer end of a spindle passing through the camera casing and engaging with the spool at its other end.

In order that the invention may be clearly understood and readily carried into effect it wil now be described more fully with reference to the accompanying drawings in which:—

Figures 1 and 2 are respectively a sectional view and side elevation of a portion of a camera to which the invention has been applied.

Figures 3, 4, 5 and 6 are examples of four forms of a detail.

Figure 7 is an "exploded" perspective view of the end of the film spool of Figures 1 and 2 with its associated parts.

Figure 8 is a section of part of a camera illustrating a modification of the arrangement of Figures 1 and 2.

In the arrangement illustrated in Figures 1 and 2, in which a clutch is employed as aforesaid, D is the film spool, C the spindle, B and E the two frictionally engaging clutch members, and F the spring which resiliently urges the member E in a direction to tension the film. The spindle C has at one end a cross pin $c$ which engages in a slot $d$ in the spool D, in the same manner as the film winder key already commonly employed, whereby the spool is coupled to this spindle. The spindle may however take other forms such as milled or split taper which fits tightly into a hole in the spool. Near the other end of the spindle is a neck $c^1$ on which the spindle turns in a hole in the side plate K of the camera casing. Next to this neck $c^1$ is a square portion $c^2$ on to which fits the member B which is in the form of a disc provided with a V-shaped groove around its edge. The disc B is held in position on the spindle C by the screw A; it may, however, if desired be riveted or soldered on to the spindle. The other member E of the clutch takes the form of a clip or collar constructed of springy material such as steel wire or the like and fits around and enters the V-groove in the disc B. The clip E may take various forms, four examples being given in Figures 3, 4, 5 and 6 the form illustrated in Figure 3 being that shown in Figures 1 and 2 and that of Figure 4 in Figure 8. In a fifth form (not shown) the clip is in the form of a triangle. Four different forms of spring F are shown by way of example in Figures 3, 4, 5 and 6.

The film spool D containing unexposed film is inserted in the camera with the spindle C engaged in the slot $d$ in the spool as shown in Figure 1. The spool D, being thus coupled to the spindle C, cannot move without the spindle (which is rotatably mounted in side plate K) moving with it. Assuming that the film is in process of being wound into position the spool D carrying the unexposed film will unwind in the direction opposite to that indicated by arrow O in Figure 2. As it does so the spindle C (not seen in Figure 2 but seen in Figure 1) will move with it and so will the disc B and the clip E, the latter stretching the spring F, one end of which is anchored to a pin or screw on the casing K. The extent of movement of the clip E is limited by a second pin $e$ also on the casing K which is adapted to engage a projection $e'$ on the clip while the film is being wound and after the clip E has reached its limit of movement the frictional grip of clip E on pulley B is overcome and E permits B to slip round. When the film has been wound into the desired position and the winding has ceased, the pull of the spring F exerted on clip E will be transferred through E's frictional grip on B to the spindle and thus exert a torque on the film spool D. This torque will tend to make the spool D rotate in the direction indicated by the arrow O and its effect on the film is to cause a continuous tension of the film, thereby stretching it taut across the two small rollers I and I¹. The film is represented by J in Figures 1 and 2. By stretching the film across two rollers only the necessity for providing a supporting frame against which the film is generally pressed by springs or a pressure plate is obviated thus enabling the whole width of the film to be utilized for the picture. In other words a larger picture is possible on the same size film and there is no waste along the sides. The principal cause of scratches on films is also thus removed as all friction on the film surface while the film is being wound in the camera is avoided since the film travels over two smooth rollers, making only rolling contact with them. Also due to dispensing with springs or pressure plate it is possible slightly to reduce the thickness of the camera. The paper backing (if the film has such) of the film does not interfere with the working of the film tensioning device as, being itself longer than the film, it will lie loosely in the camera as indicated by the dotted line L in Figure 2.

Should the film be drawn towards the front of the camera by the suction caused by pulling out the camera front of a folding roll-film camera too quickly, the tension of the film will restore the film to its original taut position as soon as the suction disappears. Again the film may stretch or expand due to absorption of moisture or through other causes. In this case the stretch is automatically taken up so that the film is flat at all times. When there is no film in position the spring F will pull the spindle round until its movement is arrested by one of the stops on the clip E engaging with the pin e.

The construction described above is suitable for cameras whose loading device permits of the insertion and withdrawal of film spools with the spindle C permanently projecting from the side wall K. The spindle may be so arranged as to slide, however, as in the form of construction illustrated in Figure 7. In this modified construction the disc B rotates between two plates M and M¹ while the spindle C, which is of square cross section, passes through a square hole in the disc B. To insert or take out a film spool the spindle C is pulled out as shown in the drawings. The working (or normal) position of the spindle C is indicated in dotted lines.

It is to be understood that the construction of the tensioning device may be varied to suit different types of film cameras and film spools; and also that the invention is not limited in its application to photographic cameras of the kind illustrated but may be applied to other apparatus in which it is desired to maintain a film in a state of tension between two rollers over which it passes or on which it is wound, for example it may be applied to cinematograph cameras or projectors.

What I claim and desire to secure by Letters Patent of the United States is:—

1. In a tensioning device for roll film cameras, the combination with a hub member adapted to be turned, of a frictional means for retarding, such turning movement comprising an annular grooved member carried by the hub, and a frictional member of resilient material for engaging the annular grooved member and including a plurality of spaced contacting areas adapted to press upon the grooved member at even spaced intervals about the periphery thereof, and a spring connected to the resilient frictional member for retarding its movement in one direction.

2. In a tensioning device for roll film cameras, the combination with a hub member adapted to be turned, of a frictional means for retarding, such turning movement comprising an annular grooved member carried by the hub, and a frictional member of resilient material including a plurality of connected spaced contacting areas adapted to create an even tension about spaced portions of the annular grooved member, the connecting portions of the contacting areas comprising resilient curved offset loops, and a spring connected to one of the offset loops and adapted to resiliently retard the movement of the frictional member in one direction.

CHEW HOCK LEONG.